Oct. 30, 1951  J. P. DÉSILETS  2,573,187
CANOE CARRIER FOR MOTOR VEHICLES
Filed Nov. 21, 1949
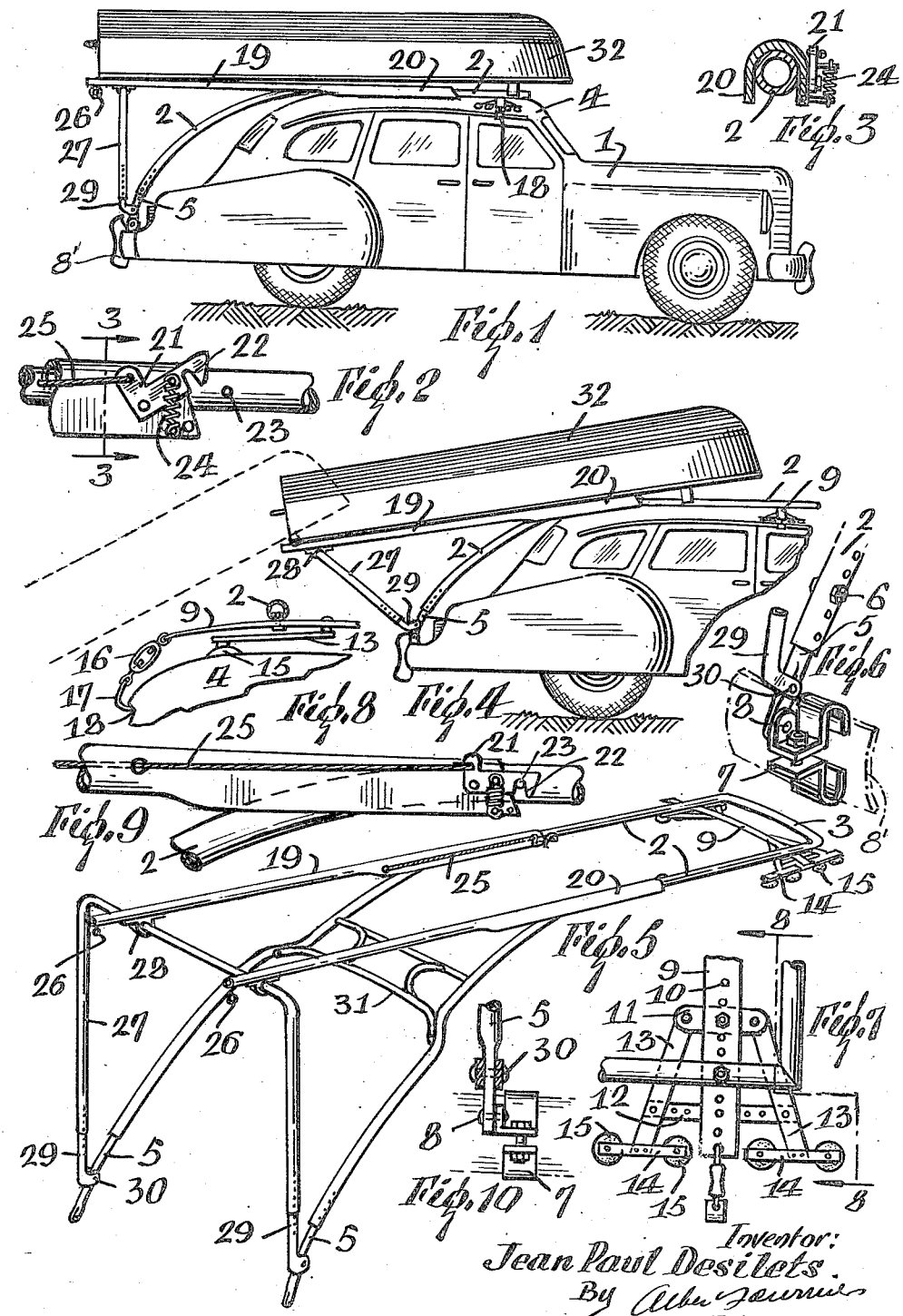
Inventor:
Jean Paul Désilets.
By *[signature]*
Attorney Patented Oct. 30, 1951

2,573,187

UNITED STATES PATENT OFFICE 2,573,187

CANOE CARRIER FOR MOTOR VEHICLES

Jean Paul Désilets, Grand' Mere, Quebec, Canada

Application November 21, 1949, Serial No. 128,573

2 Claims. (Cl. 224—42.03)

The present invention pertains to a novel device for carrying a canoe on the top of a motor vehicle.

The principal object of the invention is to provide a device of this character that enables easy loading and unloading of the canoe. Another object of the invention is to provide such a device that is held partly by suction cups and partly by a pivotal attachment to the rear bumper of the vehicle.

Still another object is to provide a canoe carrier that is constructed of a relatively small number of simple and inexpensive parts and which is easily manipulated for loading and unloading.

In the accomplishment of these objects, the device comprises a pair of parallel legs attached to the top of the vehicle by suction cups and bent downward to the rear bumper to which they are pivotally attached. A pair of rails are alined horizontally with the legs and attached thereto by releasable latches. A frame is pivotally suspended from the rails and is pivotally attached to the lower ends of the legs.

The canoe rests on the rails. When it is to be loaded or unloaded, the latches are released and the frame swung downward bringing the rails within reach of the operator.

The invention is fully disclosed by way of example in the following description and in the accompanying drawings in which:

Figure 1 is a side elevation of a motor vehicle equipped with the invention; Figure 2 is a detail elevation; Figure 3 is a section on the line 3—3 of Figure 2; Figure 4 is an elevation similar to Figure 1, showing a different position; Figure 5 is a perspective view of the carrier; Figure 6 is a detail perspective view; Figure 7 is a detail plan view; Figure 8 is a section on the line 8—8 of Figure 7; Figure 9 is a detail elevation, and Figure 10 is a detail rear view.

Reference to these views will now be made by use of like characters which are employed to designate corresponding parts throughout.

In Figure 1 is shown a motor vehicle 1 of the sedan type. A carrier frame for a canoe is mounted on the top thereof and secured to the rear.

The frame includes a U-member comprising sides or legs 2 and a cross bar 3, lying on the top 4, with the bar forward. The legs 2 are curved downward and have adjustable telescoped end pieces 5 secured in position by bolts 6 (Fig. 6). Clamps 7 are secured to the rear bumper 8', and the members 5 are pivoted at 8 to the clamps.

A cross bar 9 is secured across the legs 2 near the portion 3. Each end of the bar 9 is perforated at 10 for the adjustable attachment of a pair of strips 11 and 12. The ends of the strips 11, 12 are joined by bars 13 extending nearly to the edges of the top 4. The outer edges of the bars 13 carry longitudinal strips 14 and these in turn carry suction cups 15 at both ends. The cups adhere to the top 4 and are capable of resisting a pressure of 200 pounds. The ends of the bar 9 are joined to turnbuckles 16 to which are attached hooks 17 adapted to engage the top gutter strips 18 of the vehicle body.

Rails 19 are laid on the top 4 and in line with the legs 2. The forward ends of the rails are of inverted U-shape as shown at 20 in Figure 3, where they slip over the legs 2. To each portion 20 is pivotally attached an angular latch 21 with a notch 22 to receive a pin 23 on the adjacent portion of the leg 2. A spring 24 normally holds the latch engaged with the pin. A wire cable 25 is attached to each latch 21, being threaded through the rail and terminating in a pull ring 26 at the rear end of the rail.

An inverted U-shaped frame member 27 is pivotally suspended from the rear ends of the rails 19 in bearings 28. End pieces 29 are telescoped adjustably in the ends of the member 27 and are pivotally attached at 30 to the members 5. A brace 31 is secured across the depending parts of the legs 2.

The canoe 32 is laid upon the rails 19 and suitably secured thereto. To remove the canoe, the latches 21 are first released from the pins 23 by pulling the rings 26. The frame 27 is then pulled rearward to swing on its pivots 30. The portions 20 thus slide on the legs 2 and may take an angular position over the depending portions of the legs, as shown in Figure 4, because of the inverted U-section of the portions 20. The canoe is thus brought within reach of the operator and can then be lifted off the frame for use.

The canoe is loaded on the carrier in like manner.

Although a specific embodiment of the invention has been illustrated and described, it will be understood that various alterations in the details of construction may be made without departing from the scope of the invention as indicated by the appended claims.

What I claim is:

1. A carrier for a canoe comprising a pair of parallel legs adapted to be mounted on the top of a motor vehicle, said legs being bent downwardly and rearwardly, means for pivotally attaching the lower ends of said legs to the rear bumper of the vehicle, a pair of rails alined horizontally with said legs, a frame pivotally suspended from said rails and pivotally attached to the lower ends of said legs, suction cups carried by said legs, said rails having inverted U-shaped portions overlapping said legs, and latches for securing said portions to said legs.

2. A carrier for a canoe comprising a pair of parallel legs adapted to be mounted on the top of a motor vehicle, said legs being bent downwardly and rearwardly, means for pivotally attaching the lower ends of said legs to the rear bumper of the vehicle, a pair of rails alined horizontally with said legs, a frame pivotally suspended from said rails and pivotally attached to the lower ends of said legs, suction cups carried by said legs, said rails having inverted U-shaped portions overlapping said legs, latches pivotally mounted on said portions, pins on said legs and engageable by said latches, springs normally holding said latches on said pins, and pull wires extending from said latches along said rails.

JEAN PAUL DÉSILETS.

REFERENCES CITED

The following references are of record in the file of this patent:

UNITED STATES PATENTS

| Number | Name | Date |
|---|---|---|
| 2,479,035 | Burkey | Aug. 16, 1949 |
| 2,486,316 | Morse et al. | Oct. 25, 1949 |

FOREIGN PATENTS

| Number | Country | Date |
|---|---|---|
| 844,348 | France | Apr. 17, 1939 |